UNITED STATES PATENT OFFICE.

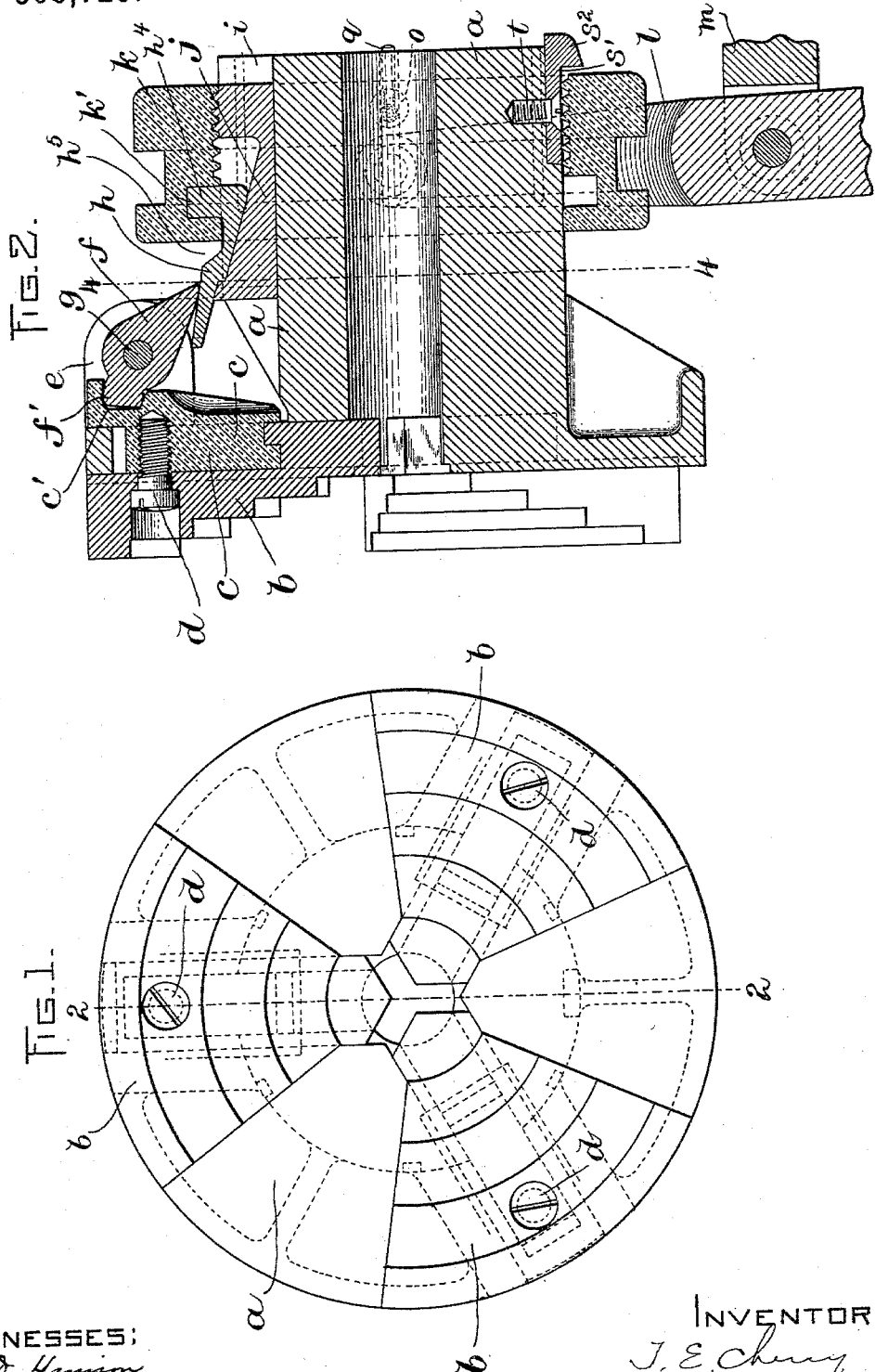

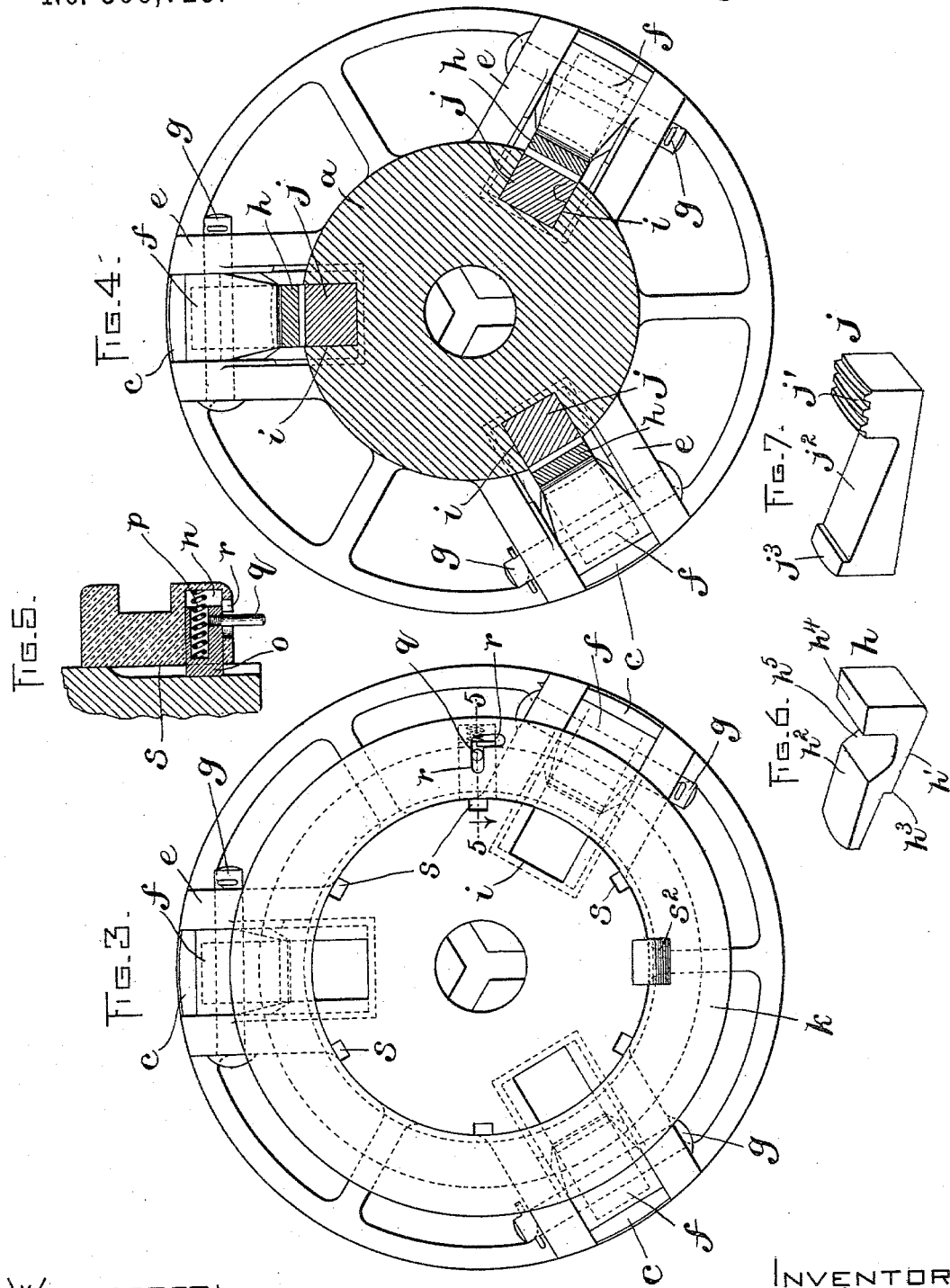

THOMAS E. CHERRY, OF BATH, MAINE.

CHUCK.

SPECIFICATION forming part of Letters Patent No. 566,725, dated August 25, 1896.

Application filed October 7, 1895. Serial No. 564,883. (No model.)

*To all whom it may concern:*

Be it known that I, THOMAS E. CHERRY, of Bath, in the county of Sagadahoc and State of Maine, have invented certain new and useful Improvements in Chucks, of which the following is a specification.

This invention relates to improvements in lathe-chucks, and is designed as an improvement on the chuck illustrated and described in my Letters Patent of the United States No. 548,773, dated October 29, 1895, in which the sliding jaws are actuated by a mechanism comprising a screw-collar, levers connected with the jaws, and wedges operated by the screw-collar and adapted to actuate the levers. I find this to be an excellent chuck, as it may be applied to any ordinary lathe-spindle and the jaws may be adjusted and be made to grasp the material to be worked on with great force. In practice, however, I find it desirable to provide the chuck with means whereby the jaws may be made to grasp the material with increasing force by slipping the collar farther longitudinally of the spindle, and also to provide means for giving the jaws a longer throw, so as to reduce their size and at the same time grasp large objects, such as gears, &c.

In the chuck illustrated in my patent above referred to the top faces of the gibs which are actuated by the wedges to throw the levers are parallel to the axis of the spindle, so that when the collar has been moved to actuate the levers it is necessary to at once revolve the collar in order to increase the grip of the jaws. Hence I desire to lengthen the play of the jaws and increase the gripping force; and I accomplish these results by forming the upper faces of the gibs as wedges and decreasing the length of the levers, so that a greater grip may be obtained by sliding the collar along the shaft. Again, another object at which I aim is to provide a spring-latch for locking the collar to the spindle, and thereby provide against the collar being accidentally revolved, so as to actuate the levers and allow the jaws to move apart.

The invention therefore consists in a chuck having its parts constructed and arranged in a peculiar way, as I shall now proceed to describe.

On the drawings, Figure 1 is a face view of a chuck constructed in accordance with my invention. Fig. 2 is a central vertical longitudinal section of the same. Fig. 3 is a rear elevation. Fig. 4 is a cross-section on the line 4 4 of Fig. 2. Fig. 5 is a detail view of the lock for fastening the collar to the central sleeve or hub. Figs. 6 and 7 show in perspective a gib and wedge, respectively.

The chuck-body has a central sleeve or hub $a$, provided with jaws $b$, sliding in grooves on the face thereof and held in said grooves by back plates $c$, sliding in corresponding grooves on the other side of the face of the chuck-body, and to which the jaws are secured by bolts $d$.

The chuck-body is provided with three pairs of ears $e$, one ear being on each side of one of the back plates. Levers $f$ are fulcrumed on pivots $g$, extending through said ears, one end of each lever having a tooth $f'$, entering a notch $c'$ in one of the back plates $c$. The other end of each lever extends rearwardly and downwardly but a short distance and rests upon a gib $h$, which I shall hereinafter describe.

The sleeve of the chuck-body is provided externally with longitudinal grooves $i$, in each of which a wedge $j$ is mounted so as to slide therein, the dimensions of the grooves being adequate to receive the wedges with their top faces flush with the periphery of the sleeve. The wedges are of the shape shown in Fig. 7—that is to say, each has a rear threaded portion $j'$, an inclined face $j^2$, and a shouldered portion $j^3$. A gib $h$ is arranged to rest upon each wedge $j$, it having an inclined bottom surface $h'$, sliding upon the inclined face $j^2$, and a forwardly-projecting inclined face $h^2$, which extends out considerably beyond the end of the wedge. It has also a shoulder $h^3$, which, together with the shoulder $j^3$, against which it is adapted to abut, forms stops to prevent too great movement of the parts relatively to each other. The gibs have upwardly-extending retaining-lugs $h^4$, which extend up into an annular groove $k'$ in a collar $k$, which surrounds the sleeve and the wedges. The collar is partially internally threaded, so as to engage the threaded portions $j'$ of the wedges, and has an external groove to receive a lug or pin on a shipping-lever $l$, pivoted on a stationary support $m$.

When the collar is rotated upon the sleeve, its internal threads engage the threads on the ends of the wedges and slide the latter one way or the other under the gibs and move said gibs radially, thereby raising or lowering the ends of the levers, which in turn act upon the jaws.

In operating the chuck the object to be worked on is placed in the jaws $b$ and the collar is moved to the right by means of the shipping-lever. The ends of the levers $f$, which were resting in the depression $h^5$ in the gibs, ride up on the inclined faces of the latter and force the jaws together through the medium of the levers $f$. Then the collar is revolved so as to draw the wedges in a direction away from the levers, and the said wedges force the gibs radially and cause the jaws to grip the material with great force. After the proper adjustment has been reached, the jaws may be loosened or tightened upon the material by means of the shipping-lever, for, by reason of the inclined surface $h^2$ at the ends of the gibs, I am enabled to obtain a very powerful grip by sliding the collar a little farther along the sleeve, so as to cause the ends of the levers to ride up farther on the inclined faces $h^2$ of the gibs.

In addition to the features above set forth, I provide a spring-latch to lock the collar in position after it has been revolved to adjust the wedges. The collar is formed with a radial aperture $n$, (see Fig. 5,) in which is mounted a slidable latch $o$, held forward by a spring $p$. $q$ is a pin threaded into the side of the latch and extending through a bayonet-slot $r$ in the end of the collar.

The sleeve of the chuck-body is provided with a series of longitudinal grooves $s$, into any one of which the latch $o$ may enter and lock the collar to the sleeve.

When it is desired to revolve the collar, the latch is drawn out of engagement with the walls of the groove, and the pin $q$ is thrust into the laterally-extending portion of the bayonet-slot $r$, which holds the latch $o$ away from the sleeve. After the desired adjustment has been accomplished, the latch is allowed to enter one of the grooves and lock the collar in place. In order to limit the play of the collar and prevent its being thrust too far in a direction away from the jaws, I provide a stop consisting of a key $s'$ with a head $s^2$, projecting out from the periphery of the sleeve of the chuck-body. This key is secured in a slot in the sleeve and is held in place by a screw $t$.

From the foregoing description it will be observed that I have accomplished several important results by the peculiar construction and arrangement of the parts. In the first place, I provide wedges for moving the levers, with two inclined faces, whereby I am enabled to shift the jaws to a greater extent than where wedges are used with a single inclined surface—that is to say, the wedge $j$ has an inclined surface $j^2$ and the gib $h$ has also an inclined top face $h^2$, and by these two inclined surfaces or faces the gib may be first moved radially, carrying with it the end of the lever $f$ to a considerable distance, by sliding the wedge longitudinally of the chuck-body, and the end of the lever may be again moved still farther by sliding the collar, the wedge, and the gib still farther along the sleeve. As has been heretofore remarked, this arrangement makes possible the use of smaller jaws and a smaller chuck-body, at the same time giving to the jaws a greater amount of play. Again, by employing the stops to limit the movement of the wedges relatively to the gibs, I prevent the parts from being bound too tightly in place and from breaking or binding by the exertion of too much force in revolving the collar. The collar is provided with means for locking it to the chuck-body, so as to hold it at practically any point to which it has been revolved, and thereby prevent the parts from accidentally loosening; and, lastly, the collar is held from too great movement by a stop secured to the sleeve.

It will be seen by reference to Fig. 2 that the lower edge of the tooth $f'$ is substantially in a line with the center of the pivot $g$, so that the roll or slip of the tooth upon the bottom of the slot $c'$, caused by the movements of the lever $f$, are reduced to the minimum, thereby advantageously applying the power and reducing the friction.

The jaws are made of such size as to cover the openings in the body of the chuck and thus prevent chips from getting through the body of the chuck to the working parts, including the collar $k$, wedges $j$, &c.

What I claim is—

1. A chuck comprising a body having a central sleeve with external grooves therein, sliding jaws, levers for adjusting said jaws, wedges in said grooves and having threaded ends, an internally-threaded collar for operating said wedges, and gibs interposed between the wedges and the levers, extending out beyond said wedges and having inclined top faces, substantially as set forth.

2. A chuck comprising a body, movable jaws, levers fulcrumed on said body and engaging said jaws, a revoluble internally-threaded collar, and wedges having threads engaged by said collar and bearing against said levers, said wedges having inclined opposing faces with stops, and the upper of said wedges having inclined top faces, substantially as set forth.

3. A chuck comprising a body, movable jaws, a revoluble internally-threaded collar, wedges connected with said jaws and having screw-threaded portions to be engaged by the threads on said collar against rotation relatively, and means for locking said collar to said chuck-body, substantially as set forth.

4. A chuck comprising a body having longitudinal grooves, movable jaws, a revoluble internally-threaded collar, wedges connected to said jaws and having screw-threaded portions to be engaged by the threads on said collar, and means for locking said collar to said chuck-body, consisting of a spring-latch adapted to enter one of the grooves in the chuck-body, substantially as set forth.

5. A chuck comprising a body, radially-movable jaws sliding in grooves in said body, and two longitudinally-movable wedges for operating each of said jaws, said wedges being provided with an inclined top face, and one of said wedges being movable relatively to the other wedge, substantially as set forth.

6. A chuck comprising a body, movable jaws, levers fulcrumed on said body and engaging said jaws, a revoluble internally-threaded collar, wedges having threads engaged by said collar, and a stop on the chuck-body for limiting the play of the collar, substantially as set forth.

7. A chuck comprising a body, movable jaws, back plates connected to said jaws and provided with slots, levers fulcrumed on the body and having teeth engaging said slots, the lower side of each tooth being substantially in line with the center of the pivot connecting the lever with the body, and means for operating said levers consisting of two sliding wedges for each lever, and a collar for sliding said wedges and for moving one relatively to the other, substantially as set forth.

In testimony whereof I have signed my name to this specification, in the presence of two subscribing witnesses, this 5th day of October, A. D. 1895.

THOMAS E. CHERRY.

Witnesses:
  A. D. HARRISON,
  ROLLIN ABELL.